United States Patent
Lukeš et al.

(10) Patent No.: US 9,568,067 B2
(45) Date of Patent: Feb. 14, 2017

(54) REVERSING DOUBLE-FLOW GEARBOX ARRANGEMENT WITH TWO BRANCHES OF OUTPUT FLOW

(71) Applicant: ZETOR TRACTORS A.S., Brno (CZ)

(72) Inventors: Miroslav Lukeš, Brno (CZ); Jan Lukáš, Zbýšov (CZ); Martin Slezák, Brno (CZ)

(73) Assignee: ZETOR TRACTORS A.S., Brno (CZ)

( * ) Notice: Subject to any disclaimer, the term of this patent is extended or adjusted under 35 U.S.C. 154(b) by 0 days.

(21) Appl. No.: 14/400,224

(22) PCT Filed: Mar. 18, 2013

(86) PCT No.: PCT/CZ2013/000038
§ 371 (c)(1),
(2) Date: Nov. 10, 2014

(87) PCT Pub. No.: WO2013/167095
PCT Pub. Date: Nov. 14, 2013

(65) Prior Publication Data
US 2015/0096409 A1    Apr. 9, 2015

(30) Foreign Application Priority Data

May 11, 2012    (CZ) .................................... 2012-313

(51) Int. Cl.
*F16H 3/08*    (2006.01)
*F16H 3/02*    (2006.01)
(Continued)

(52) U.S. Cl.
CPC ................ *F16H 3/02* (2013.01); *F16H 3/006* (2013.01); *F16H 37/04* (2013.01); *F16H 3/097* (2013.01);
(Continued)

(58) Field of Classification Search
CPC .. F16H 3/006; F16H 2003/0931; F16H 3/091; F16H 47/02
(Continued)

(56) References Cited

U.S. PATENT DOCUMENTS 5,014,566 A * 5/1991 Kashiwase ............. B60K 17/06
74/331
6,186,029 B1   2/2001 McQuinn
(Continued)

FOREIGN PATENT DOCUMENTS

| EP | 0 797 025 A1 | 9/1997 |
| GB | 2 110 324 A | 6/1983 |
| WO | WO 2005/012762 A1 | 2/2005 |

OTHER PUBLICATIONS

International Preliminary Report on Patentability in corresponding PCT Application No. PCT/CZ2013/000038, mailed Nov. 11, 2014.
(Continued)

*Primary Examiner* — Ha D Ho
(74) *Attorney, Agent, or Firm* — Leason Ellis LLP.

(57) ABSTRACT

Arrangement of reversing double-flow gearbox for motor vehicles and construction machines, with two branches of output flow, consisting of an input shaft (13) equipped with a tooth wheel, engaged with a tooth wheel of a first disc clutch (1) and with a tooth wheel of a second disc clutch (2), wherein an output shaft (11) of the first disc clutch (1) houses a first set (3) of tooth wheels and a third set (5) of tooth wheels that are engaged through a first synchronization clutch (61) and a second synchronization clutch (62) with a set of tooth wheels arranged on the output shaft (10) of the gearbox, while an output shaft (12) of the second disc clutch (2) houses a second set (4) of tooth wheels and a fourth set (7) of tooth wheels that are engaged through a third synchronization clutch (63) and a fourth synchronization clutch (64) with a set of tooth wheels arranged on the output shaft (10) of the gearbox, wherein the output shaft (11) of the first
(Continued)

disc clutch (1) and the output shaft (12) of the second disc clutch (2) are inter-connected by an inserted set of gears (8) with a gearing synchronization clutch (9) arranged on the output shaft (12) of the second clutch disc (2) or on output shaft (11) of the first disc clutch (1).

1 Claim, 1 Drawing Sheet

(51) Int. Cl.
   *F16H 37/04*   (2006.01)
   *F16H 3/00*    (2006.01)
   *F16H 3/097*   (2006.01)

(52) U.S. Cl.
   CPC . *F16H 2003/0822* (2013.01); *F16H 2037/049* (2013.01); *F16H 2200/006* (2013.01); *F16H 2200/0095* (2013.01); *Y10T 74/19074* (2015.01)

(58) Field of Classification Search
   USPC .................................. 74/330, 331, 333, 340
   See application file for complete search history.

(56) References Cited

U.S. PATENT DOCUMENTS

| | | | |
|---|---|---|---|
| 7,226,379 B2 * | 6/2007 | Ibamoto | B60K 6/36 180/65.25 |
| 7,263,907 B2 * | 9/2007 | Stevenson | F16H 3/006 74/331 |
| 7,670,256 B2 * | 3/2010 | Winkelmann | B60W 10/08 477/5 |
| 8,887,589 B2 * | 11/2014 | Ibamoto | F16H 3/006 74/330 |
| 2002/0033059 A1 * | 3/2002 | Pels | B60K 6/24 74/329 |

OTHER PUBLICATIONS

International Search Report and Written Opinion in corresponding PCT Application No. PCT/CZ2013/000038, mailed Sep. 30, 2013.
English translation of the document AO 228977.

* cited by examiner

REVERSING DOUBLE-FLOW GEARBOX ARRANGEMENT WITH TWO BRANCHES OF OUTPUT FLOW

CROSS-REFERENCE TO RELATED PATENT APPLICATIONS

This application is a U.S. National Phase Application under 35 U.S.C. §371 of International Patent Application No. PCT/CZ2013/000038, filed Mar. 18, 2013, and claims the priority of PV 2012-313, filed May 11, 2012, all of which are incorporated by reference in their entireties. The International Application was published on Nov. 14, 2013 as International Publication No. WO 2013/167095 A1.

TECHNICAL FIELD

The invention relates to arrangement of reversing double-flow gearbox, mainly for motor vehicles and construction machines with two branches of output flow, i.e. gearboxes with two separate branches of drive and two clutches, extended with reversing of all the gear gears.

STATE OF THE ART

The double-flow gearbox is a special type of semi-automatic device when the output from the engine to the driving shaft can flow through two ways. Closing of one of the pairs of disc clutches sets which one of them transfers the output. One clutch connects odd speed gears, while the other connects even speed gears.

The double-flow gearboxes are manufactured with one reverse gear (passenger cars and lorries) or with lower number of reverse gears than forward gears, while each reverse gear is performed using one inserted wheel which reverses the rotation direction. The reversing of the whole double-flow gearbox i.e. all the speed gears is performed using an additional reversing gearbox with a pair of proper disc clutches (tractors and construction machines).

The AO 228977 describes the scheme of double-flow three-up to four gear gearbox for motor vehicles and construction machines with two independent branches of output flow with pre-selection, allowing shifting of gears under load without hydraulic elements in mechanic gearbox. The basis of this invention is the kinematic relation of individual parts of the mechanic gearbox with two input friction clutches and two branches of output flow allowing shifting of individual gears under load. It solves placement of individual elements and clutches with realisation of three or four forward and one reverse gear. The disadvantage of the solution in AO 228977 is the low number of gears and version with one reverse gear, impossibility of reversing all the gears as required by modern gearboxes of tractors and construction machines.

The disadvantage of other current double-flow gearboxes is the fact that for reversing all the gears there is necessary another pair of disc clutches with their own reversing gearbox.

SUMMARY OF THE INVENTION

The aim of the invention is to design such a system of kinematic arrangement of the double-flow gearbox that allows for the double-flow gearbox with one direction of rotation of the output shaft to change the direction of rotation of the output shaft for all the gears using one inserted tooth wheel or one set of gears and one synchronisation clutch.

The above stated imperfections are eliminated by arrangement of the reversing double-flow gearbox, mainly for motor vehicles and construction machines, with two branches of output flow, consisting of the input shaft equipped with a tooth wheel, which is engaged with the tooth wheel of the first disc clutch and tooth wheel of the second disc clutch and two branches of the flow, where on the output shaft of the first disc clutch, there is connected via the first synchronisation clutch and the second synchronisation clutch the first set of tooth wheels and the third set of tooth wheels, that are engaged with the set of tooth wheels arranged on output shaft with one direction of revolutions for all the gears, while on the output shaft of the second disc clutch there are interconnected via the third synchronisation clutch and the fourth synchronisation clutch the second set of tooth wheels and the fourth set of tooth wheels, that are engaged with the set of tooth wheels arranged on the output shaft, which is based on the fact that the output shaft of the first disc clutch and the output shaft of the second disc clutch are inter-connected by inserted set of wheels with the shifting synchronisation clutch arranged on output shaft of the second disc clutch or output shaft of the first disc clutch.

The inserted set of tooth wheels is connected to kinematic system of double-flow gearbox in such a way that after shifting its synchronisation clutch and switch over of disc clutches there occurs reversing of revolutions of the output shaft for given shifted gear. In this way it is possible to reverse all the gears of the double-flow gearbox and simultaneously it is possible to change individual gears—with shifted reversing—of the double-flow gearbox and to change in this way the transmission of reversing revolutions of the output shaft. The reversing control is independent on the number of gears of the double-flow gearbox.

So as to save space, it is favourable if the arrangement of the reversing double-flow gearbox mainly for motor vehicles and construction machines, with two branches of output flow consisting of the input shaft and output shaft of the gearbox, arranged on co-axially, while the drive of the input shaft leads to the first disc clutch and the second disc clutch, while the first branch of the flow consists of the first disc clutch interconnected by the first output shaft with the first set of tooth wheels consisting of the first tooth wheel, the second tooth wheel and the third tooth wheel, while the second branch of the of the flow consists of the second disc clutch interconnected by the output shaft with the second set of tooth wheels consisting of the first tooth wheel, the second tooth wheel and the third tooth wheel, where the second and the third tooth wheel of the first set of tooth wheels and the first, second and third tooth wheel of the second set of tooth wheels are engaged with tooth wheels located on the output shaft of the gearbox and they are interconnected with the output shaft of the gearbox via the first synchronisation clutch shifting the gears of the first branch of the flow, the second synchronisation clutch shifting the gears of the second branch of the flow and the third synchronisation clutch shifting by one side the gear the gear level of the first branch of the flow and by the other side of the gear the gear level of the second branch of the flow, according to claim 1, based on the fact that the output shaft of the first disc clutch is interconnected via the tooth wheel engaged with the first tooth wheel of the first set of tooth wheels, which is further engaged with inserted tooth wheel and shifting synchronisation clutch with output shaft of the second disc clutch.

BRIEF DESCRIPTION OF THE DRAWINGS

The invention will be explained in detail using a drawing with FIG. 1 showing a scheme of the kinematic arrangement of reversing 8° double-flow gearbox and FIG. 2 showing a scheme of the kinematic arrangement of reversing 6° double-flow gearbox.

EXEMPLARY EMBODIMENT OF THE INVENTION

The arrangement of the double-flow reversing gearbox according to this invention will be explained using favourable realisations, which do not have any limiting influence from the point of view of protection extent.

Figure 1:
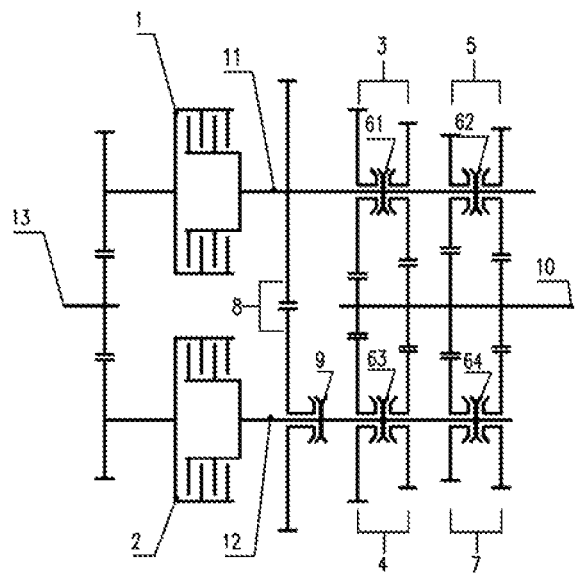

The sample arrangement of the reversing 8° double-flow gearbox is shown in FIG. 1. The drive from the input shaft 13 leads to the first disc clutch 1 and the second disc clutch 2. The first branch of the flow consists of the first disc clutch 1 interconnected by output shaft 11 of the first disc clutch 1 with the first synchronisation clutch 61 equipped with the first set 3 of tooth wheels and the second synchronisation clutch 62 equipped with the third set 5 of tooth wheels that are engaged with tooth wheels organised on the output shaft 10. The second branch of the consists of the disc clutch 2 interconnected by output shaft 12 of the second disc clutch 2 with the third synchronisation clutch 63 equipped with the second set 4 of tooth wheels and the fourth synchronisation clutch 64 equipped with the fourth set 7 of tooth wheels also engaged with tooth wheels organised on the output shaft 10.

The inserted set of tooth wheels 8 with its synchronisation clutch 9 interconnects the output shaft 11 of the first disc clutch 1 and the output shaft 12 of the second disc clutch 2.

The principle of reversing is as follows. The vehicle goes forward and the drive is performed e.g. by the first branch of the flow with included first disc clutch 1. So there is engaged the first disc clutch 1 and there is included the first synchronisation clutch 61 or the second synchronisation clutch 62, organised on the output shaft 11 of the first disc clutch 1. Then, movement is transferred by one tooth wheel of the first set 3 of tooth wheels or the third set 5 of tooth wheels, engaged with tooth wheels arranged on the output shaft 10. The second disc clutch 2 is disconnected, even the third synchronisation clutch 63 and the fourth synchronisation clutch 64 in the second branch of the flow are not shifted and the synchronisation clutch 9 is not shifted as well. After inclusion of the synchronisation clutch 9 the inserted set of wheels 8 drives even the output shaft 12 of the second disc clutch 2, but in opposite direction of rotation. After consequent disconnection of the first disc clutch 1 and connection of the second disc clutch 2 the reversing is performed, i.e. reverse direction of revolutions of the output shaft 10 of the gearbox for given gear level shifted by the first synchronisation clutch 61 or the second synchronisation clutch 62, in the first branch of the drive. In this way, there is arranged reversing for all the gear levels performed by the first set of 3 tooth wheels or the third set 5 of tooth wheels. In case of the forward movement to be performed by the second branch of the flow with the second disc clutch 2 the activity is analogical, the shifted third synchronisation clutch 63 equipped with the second set 4 of tooth wheels or shifted fourth synchronisation clutch 64 equipped with the fourth set 7 of tooth wheels use one of the above stated tooth wheels to transfer motion to the set of tooth wheels organised on the output shaft of the gearbox 10. Based on repeated shifting of the synchronisation clutch 9 with consequent disconnection of the second disc clutch 2 and connection of the first disc clutch 1 there is performed reversing of revolutions of the output shaft of the gearbox 10 for the given gear level.

Figure 2:
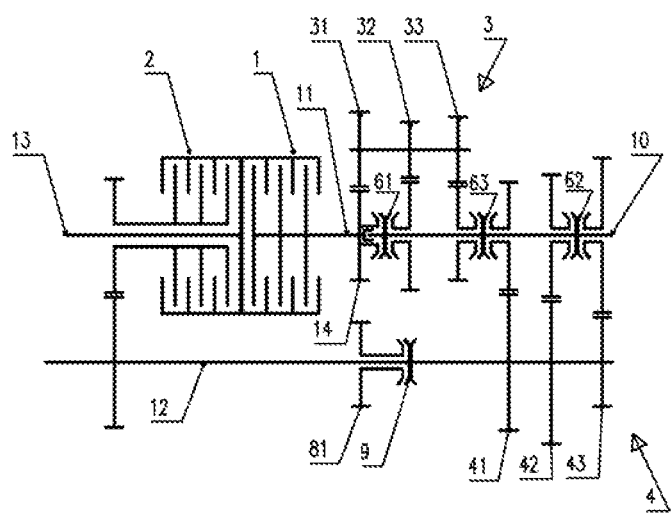

The sample arrangement of the reversing 6° double-flow gearbox is shown in FIG. 2. The arrangement of the input shaft 13 and output shaft of the gearbox 10 is coaxial. The drive from the input shaft 13 leads to the first disc clutch 1 and the second disc clutch 2. The first branch of the flow consists of the first disc clutch 1 interconnected by output shaft 11 of the first disc clutch 1 and via the tooth wheel 14 with the first set 3 of tooth wheels, making the first tooth wheel 31, the second tooth wheel 32 and the third tooth wheel 33. The second branch of the consists of the disc clutch 2 interconnected by output shaft 12 of the second disc clutch 2 with the second set 4 of tooth wheels, making the first tooth wheel 41, the second tooth wheel 42 and the third tooth wheel 43. The second and the third tooth wheel 31, 32 of the first set 3 of tooth wheels as well as the first, the second and the third tooth wheels 41, 42, 43 of the second set 4 of tooth wheels are engaged with tooth wheels organised on the output shaft 10 of the gearbox and they are interconnected with the output shaft 10 of the gearbox via the first synchronisation clutch 61 shifting the gear levels of the first branch of the flow, the second synchronisation clutch 62 shifting the gear levels of the second branch of the flow and the third synchronisation clutch 63 shifting with one side the gear level of the first branch of the flow and with the other side the gear level of the second branch of the flow.

The inserted tooth wheel 81 is engaged with the first tooth wheel 31, which is further engaged with the tooth wheel 14 and via shifted synchronisation clutch 9 there is interconnected the output shaft 11 of the first disc clutch 1 and the output shaft 12 of the second disc clutch 2.

The principle of reversing is as follows. The vehicle goes forward and the drive is performed e.g. by the first branch of the flow with included first disc clutch 1. So there is engaged the first disc clutch 1 and revolutions are then transferred directly from the output shaft 11 of the first disc clutch 1 to the output shaft 10 of the gearbox or via the tooth wheel 14 to the first set 3 of tooth wheels consisting of the first, the second and the third tooth wheel 31, 32 and 33 to co-engaged wheels interconnected by the first and the third synchronisation clutch 61 and 63 with the output shaft 10 of the gearbox. The second disc clutch 2 is disconnected, even the second synchronisation clutch 62 in the second branch of the flow is not shifted and the synchronisation clutch 9 is not shifted as well. After inclusion of the synchronisation clutch 9 the inserted set of wheels 81 drives even the output shaft 12 of the second disc clutch 2, but in opposite direction of rotation. After consequent disconnection of the first disc clutch 1 and connection of the second disc clutch 2 the reversing is performed, i.e. reverse direction of revolutions of the output shaft 10 of the gearbox for given gear level shifted by the first synchronisation clutch 61 or the third synchronisation clutch 63 in the first branch of the drive. In this way, there is arranged reversing for all the gear levels performed by the first branch of the flow. In case of the forward movement to be performed by the second branch of the flow with the second disc clutch 2 the activity is analogical, the movement is transferred by the second set 4 of tooth wheels consisting of the first, the second and the third tooth wheel 41, 42, 43 and shifted second synchronisation clutch 62 or the third synchronisation clutch 63 it is lead to the output shaft 10 of the gearbox. Based on repeated shifting of the synchronisation clutch 9 with consequent disconnection of the second disc clutch 2 and connection of the first disc clutch 1 there is performed reversing of revolutions of the output shaft of the gearbox 10 for the given gear level.

INDUSTRIAL APPLICABILITY

This solution can be used with tractors, construction machines and other mobile means.

LIST OF RELATION MARKS 1 first disc clutch
2 second disc clutch
3 first set of tooth wheels
31 first tooth wheel
32 second tooth wheel
33 third tooth wheel
4 second set of tooth wheels
41 first tooth wheel
42 second tooth wheel
43 third tooth wheel
5 third set of tooth wheels
61 first synchronisation clutch
62 second synchronisation clutch
63 third synchronisation clutch
64 fourth synchronisation clutch
7 fourth set of tooth wheels
8 inserted set of wheels
81 inserted tooth wheel
9 synchronisation clutch
10 output shaft of the gearbox
11 output shaft of the first disc clutch
12 output shaft of the second disc clutch
13 input shaft
14 tooth wheel

The invention claimed is:

1. An arrangement of a reversing double-flow gearbox, for motor vehicles and construction machines, with two branches of output flow, the arrangement comprising:
consisting of the an input shaft (13) and an output shaft (10) of the gearbox, arranged co-axially, wherein the drive from the input shaft (13) is interconnected to a first disc clutch (1) and a second disc clutch (2),
wherein the output shaft (10) of the gearbox is interconnected to a first synchronisation clutch (61) for gearing the gear levels of the first branch of the output flow, a second synchronisation clutch (62) for gearing the gear levels of the second branch of the output flow, and a third synchronisation clutch (63) for gearing on one side of the arrangement the gear level of the first branch of the output flow and gearing with the other side of the arrangement the gear level of the second branch of the output flow;
on the first branch of the output flow, an output shaft (11) of the first disc clutch (1) is interconnected to a first set (3) of tooth wheels having a first tooth wheel (31), a second tooth wheel (32) and a third tooth wheel (33);
on the second branch of the output flow, an output shaft (12) of the second disc clutch (2) is interconnected to a second set (4) of tooth wheels having a first tooth wheel (41), a second tooth wheel (42) and a third tooth wheel (43),
wherein the second and third tooth wheels (32, 33) of the first set (3) of tooth wheels and the first, second, and third tooth wheels (41, 42, 43) of the second set (4) of tooth wheels are engaged with one or more tooth wheels arranged on the output shaft (10) of the gearbox which are interconnected with one or more of the first synchronization clutch, the second synchronization clutch, and/or the third synchronization clutch;
a tooth wheel (14) engaged with the first tooth wheel (31) of the first set (3) of tooth wheels, whereby the output shaft (11) of the first disc clutch (1) is interconnected to the first synchronization clutch (61) to drive the first branch of the output flow; and
an inserted tooth wheel (81) gearing with a synchronisation clutch (9) which is interconnected to and drives the output shaft (12) of the second disc clutch (2).

* * * * *